United States Patent Office 3,337,195
Patented Aug. 22, 1967

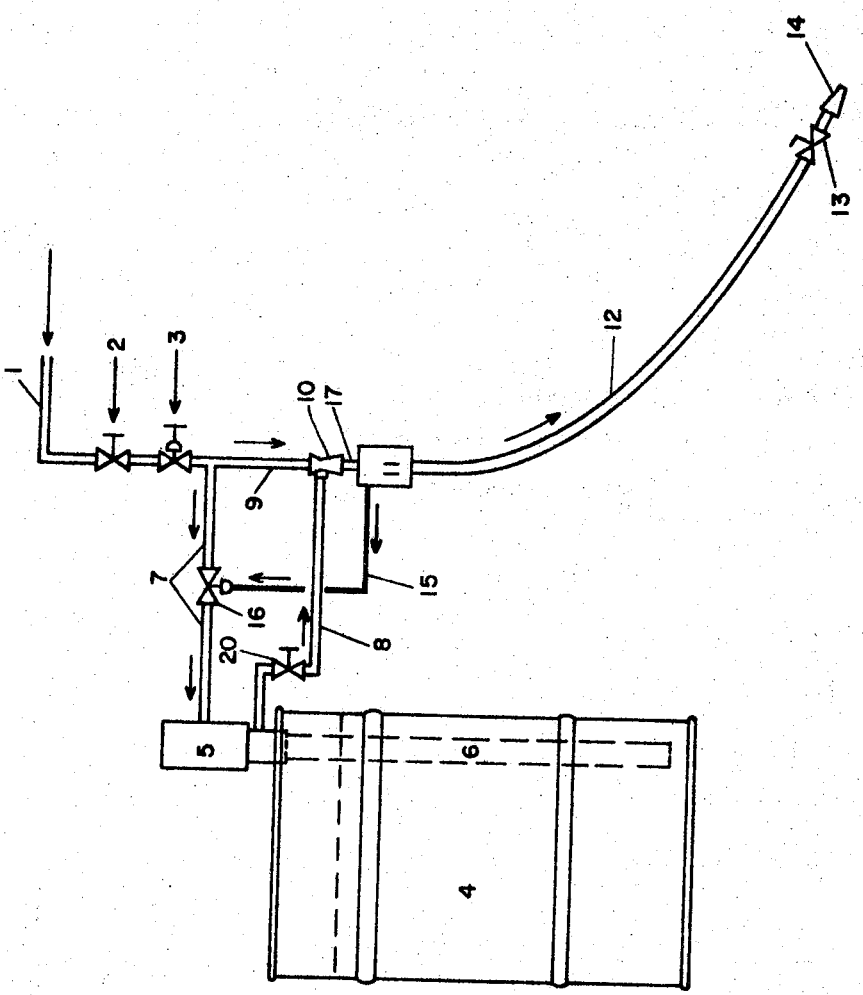
INVENTOR
ROBERT E. FARISON
BY William W. McDowell Jr.
ATTORNEY

3,337,195
FOAM GENERATING APPARATUS
Robert E. Farison, Cincinnati, Ohio, assignor to W. R. Grace & Co., New York, N.Y., a corporation of Connecticut
Filed Mar. 15, 1966, Ser. No. 534,378
4 Claims. (Cl. 261—27)

ABSTRACT OF THE DISCLOSURE

A foam generating apparatus has a compressed air driven pump connected by way of a gas conduit to a compressed air source, the pump outlet being connected to a mixing means where liquid pumped thereby is mixed with compressed air. Foam from the mixing means is fed to a foam applying conduit. Means responsive to the opening and closing of the foam applying conduit is connected to the gas conduit for controlling air flow to the pump in response to back-up pressure in the foam applying conduit.

---

This invention relates to foam generating apparatus, more particularly apparatus for generating a foam from an open reservoir of liquid and, where desired, delivering the foam over relatively long distances to the intended point of use.

Methods and means for generating foams of many types and uses are old in the art. One problem which continues to trouble workers in the art is the difficulty in generating a foam from foamable liquid held in an open reservoir. Another and much more vexatious problem is the great difficulty, due to the inherent viscosity of foams, in forcing a generated foam over any significant distances through restricted feed conduits. The capability of applying a foam at a use point remote from the point where it is generated is thus essentially non-existent.

It is an object of this invention to provide means for overcoming the mentioned prior art difficulties.

A specific object is to provide apparatus for the generation of a foam from an open reservoir of foamable liquid.

Yet another specific object is to provide apparatus for generation of a foam from an open reservoir of foamable liquid and for delivery of the generated foam through a discharge conduit to an application nozzle or like outlet located at a point remote from the point of foam generation.

Still other objects and the many advantages of the present invention will become apparent to those skilled in the art upon consideration of the following more detailed description of presently preferred embodiments, taken in connection with the accompanying drawing in which:

The figure is a schematic diagram of apparatus according to the invention, illustrating the presently preferred embodiment.

The present invention is based upon the discovery that foams can be readily generated from an atmospheric supply of foamable liquid by withdrawing the liquid from the supply and feeding it to a foam generating liquid-gas mixer by means of a compressed gas driven piston pump and generating a foam from the liquid by vigorously mixing it with compressed gas emanating from the same source as that which supplies the driving power for the pump. The foam can then be discharged through the outlet of a relatively elongated (up to 200 feet or more) restricted (e.g., ½ inch inside diameter) discharge conduit, such as a flexible plastic or rubber hose, with little or no difficulty. This highly desirable feature is primarily due to the fact that the piston pump is capable of delivering liquid to the foam generating mixing means at pressures considerably higher than the compressed gas pressure needed to operate the pump. Liquid delivery from the pump is essentially unaffected by the back pressure in the discharge conduit. Thus capability of the system to feed foamable liquid and to generate foam from such liquid is maintained despite considerable pressure fluctuation or pressure build up in the foam generating mixing means or in the discharge conduit. By proper selection of the piston ratio in the pump, operation can be sustained in opposition to almost any build-up of back pressure that could occur in practical use. In order to assure such continuous capability the system preferably includes means for closing off the compressed gas drive for the piston pump when the outlet of the foam discharge conduit is closed, so that no back pressure buildup occurs from continued foam generation after the outlet is closed.

The foamable liquid used in the practice of the present invention is not, per se, a part of the invention. Liquids of widely varying composition may be used depending primarily upon the end use application for which the foam is intended. One particularly widespread use for foams is in industrial cleaning applications. The apparatus and method of this invention is well adapted for such uses. A wide variety of foamable liquid compositions suitable for such use and desirable properties of foams to be made from such compositions are well known to those skilled in the art. Typical examples of such liquid compositions and foams prepared therefrom are fully disclosed in U.S. Patent 3,037,887 issued June 5, 1962 to J. W. Brenner et al.; the entire disclosure of which is incorporated herein by reference. Other examples will be readily apparent to skilled artisans.

The gas employed in the foam generating apparatus and method of this invention may be virtually any gas. Ordinarily the gas is one which is inert to the components of the foamable liquid. In usual cases air is employed. In those instances where the use of air may have undesirable side effects of one kind or another, other gases, such as nitrogen, are suitable.

Reference will now be made to the drawing which illustrates a presently preferred embodiment of the apparatus of the present invention. This apparatus comprises a source of compressed gas (not shown) capable of supplying, via supply conduit 1, compressed gas (such as air) at a pressure of from about 25 to about 200 pounds per square inch or more. The supply line 1 includes a shut off valve 2 and a pressure regulator 3. The illustrated device also includes an open reservoir such as a tank or drum 4 of foamable liquid. The intake conduit 6 of a compressed gas operated piston pump 5 (for example, in the case of compressed air a pneumatic piston pump) is located near the bottom of the reservoir. The gas supply conduit 1 is divided into two separate conduits 7 and 9. Conduit 7 delivers compressed gas to the low pressure side of the compressed gas piston pump in order to drive the same. As a result, foamable liquid is withdrawn from the reservoir 4 by intake conduit 6 and forced by the pump through the liquid feed tube 8 to a gas liquid mixing T 10. Also leading into the mixing T 10 is the other arm 9 of the divided gas supply conduit. The combination of the high pressure gas in conduit 9 with foamable liquid from conduit 8 in the mixing T 10 results in the generation of a foam. The mixing T may be of varying design but is usually a venturi-type mixer, in order to provide for thorough and complete mixing of the compressed gas and foamable liquid. Preferably the produced foam is passed via a short conduit 17 into an expansion or dwell chamber 11 where the foam has an opportunity to become stabilized and homogenized for steady flow through the discharge conduit 12. The conduit 12 is an elongated, restricted flow passage for the foam and serves to deliver it to an outlet such as a nozzle 14 for application at the point of use. In a typical example the discharge conduit is a ½ inch inside diameter rubber hose which may have a length of up to 200 feet or more.

A major feature of the illustrated system is its ease of regulation. By using a relatively high ratio piston pump (e.g., a 3 or 4 to 1 ratio) the effluent liquid pressure capability in conduit 8 greatly exceeds operating compressed gas pressure in either of conduits 7 or 9; and the pump delivery is essentially unaffected by the back pressures in the discharge conduit 12 and/or its nozzle 14. This is a feature of major importance since the pressure within the mixing T 10 can vary over a very wide range.

The pressure regulator 3 serves to provide constant pressure for the piston pump operation and for the mixing of compressed gas and liquid in the mixing T 10 to generate a foam. It is generally desirable to have a shut off valve 13 available at the outlet of the discharge conduit 12 so that the operator may control the flow of foam at the point of use. Means are also provided for discontinuing compressed gas supply to the pump drive via conduit 7 when the valve 13 at the outlet of the discharge conduit is closed. In the absence of such means the pressure within the delivery conduit 12 may build up until it balances against the effluent liquid pressure of the pump. For example, a 4 to 1 ratio pump operating on 100 pound per square inch compressed gas will have a balance effluent pressure of 400 pounds per square inch back pressure in the delivery conduit 1. Rather simple means providing for the such control is a dipahragm valve 16 in the gas conduit 7 one side which is connected via a pressure sensing tube 15 or like device to a point in the discharge conduit 12 or dwell chamber 11. In this way any pressure build up in the discharge conduit will be transmitted by the tube or other means 15 and close the diaphragm valve when the pressure in the discharge conduit and/or dwell chamber builds up to a value greater than the compressed gas pressure regulated by the pressure regulator 3.

Actual operations with a system like that illustrated, using compressed air as a gas supply, has shown that the combination of a pneumatic piston pump having a 4 to 1 ratio and a compressed air supply at pressures of in the range of from about 40 to about 150 pounds per square inch results in the generation of very good foams in the mixing T 10 and also the capability of delivering these foams through a discharge conduit having an inside diameter of ½ inch or lower and a length up to and exceeding 200 feet.

In order to regulate the relative dryness of foam produced according to the invention a metering valve 20 is provided in the liquid feed conduit 8. Suitable adjustment of this valve controls the amount of liquid passing through the conduit 8 and, in turn, the ratio of liquid to gas entering the mixing means 10, in which the foam is generated. In this manner one can achieve a wide range in the relative wetness or relative dryness of foam produced from any particular foamable liquid at any given gas pressure as set by pressure regulator 3.

Various modifications of the apparatus described hereinabove will become obvious to those skilled in the art. It is therefore intended that the scope of the invention be limited only by the scope of the appended claims.

What is claimed is:

1. Foam generating apparatus comprising, in combination:
   (a) a source of compressed gas
   (b) a compressed gas operated piston pump
   (c) bifurcated compressed gas conduit means, one arm of which connects to the said pump and the other arm of which connects to a liquid-gas mixing means
   (d) a source of foamable liquid;
   (e) means feeding said liquid to said mixing means by operation of said pump so as to form a foam in said mixing means;
   (f) foam applying conduit means connected to the outlet of said mixing means; and
   (g) means for opening and closing the arm of the gas conduit means connected to the pump in response to the opening and closing, respectively, of the outlet of said foam applying conduit means.

2. Apparatus of claim 1 wherein the opening and closing means in the conduit to the pump is automatically operated in response to build up of back pressure in the foam applying conduit means.

3. Apparatus as defined in claim 2 further comprising gas pressure regulating means between the gas source and the bifurcated gas conduit means.

4. Apparatus of claim 2 wherein said compressed gas is air.

References Cited

UNITED STATES PATENTS

| | | | |
|---|---|---|---|
| 1,649,062 | 11/1927 | Halliburton. | |
| 1,839,658 | 1/1932 | Dugas | 169—15 X |
| 1,977,171 | 10/1934 | Clithero et al. | 169—15 X |
| 2,201,040 | 5/1940 | Hansen-Ellehammer | 261—35 |
| 2,262,102 | 11/1941 | Hunter | 239—311 |

FOREIGN PATENTS 644,103    7/1962    Canada.

HARRY B. THORNTON, *Primary Examiner.*

TIM R. MILES, *Assistant Examiner.*